Sept. 6, 1927.                    C. E. STIGERS                    1,641,399
                                      RIM
                              Filed March 24, 1926
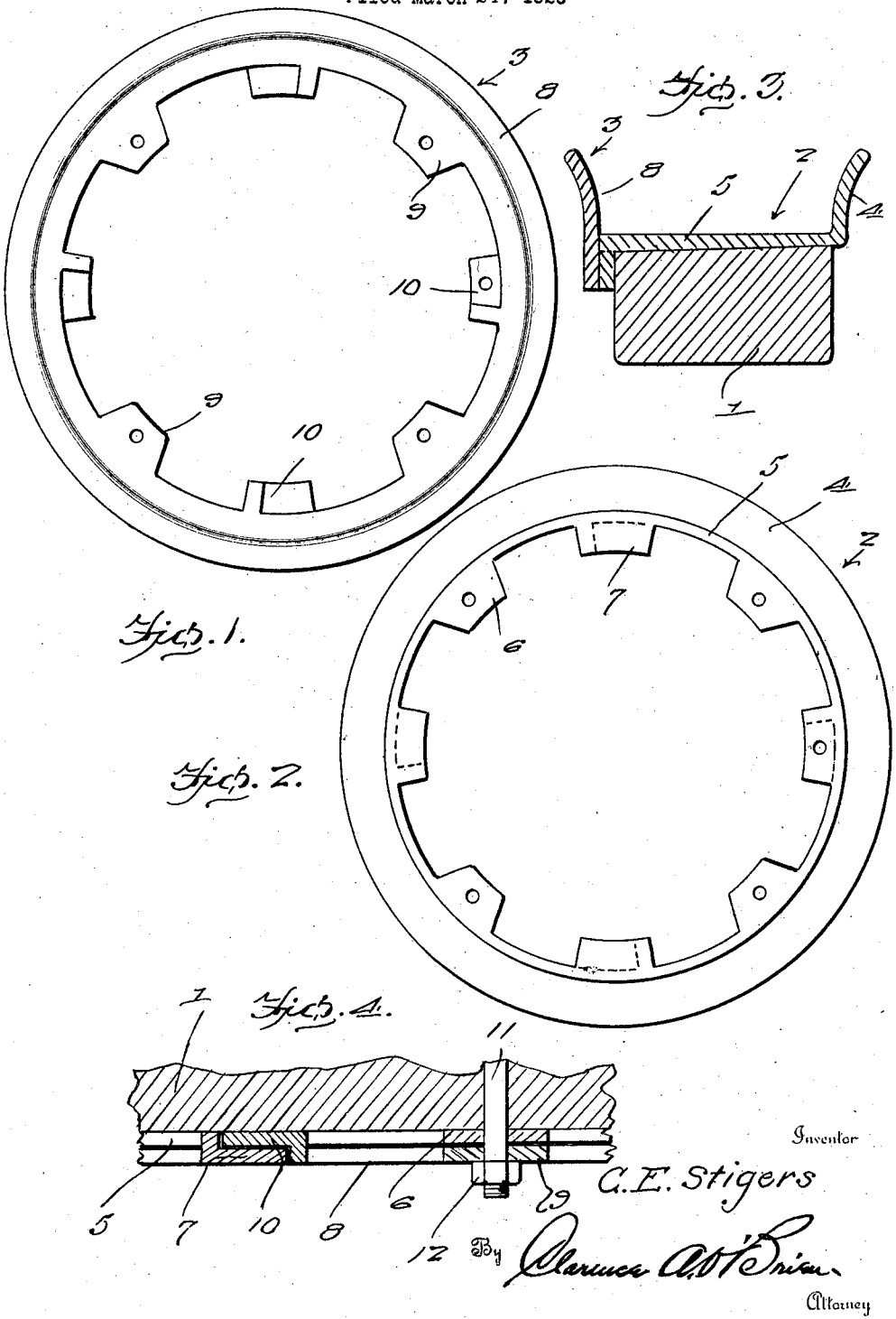
Inventor
C. E. Stigers
By Clarence A. O'Brien
Attorney Patented Sept. 6, 1927.

1,641,399

UNITED STATES PATENT OFFICE.

CHESLEY E. STIGERS, OF MARSHALL, OKLAHOMA.

RIM.

Application filed March 24, 1926. Serial No. 97,055.

This invention relates to an improved metallic rim for use upon automobile wheels for holding a tire in position thereon.

The principal object is to generally improve upon rim structures of this class by providing one of comparative simplicity, and durability which is simple and inexpensive in construction, and exceedingly efficient in use.

An equally important object is to provide a rim structure which is made up of a relatively stationary section to fit upon the wheel felly, and a removable flange section for detachable connection with the first named section, the arrangement facilitating application and removal of the tire.

Other objects and advantages will become apparent from the following description and drawing.

In the accompanying drawing forming a part of this application, and in which like numerals are employed to designate like parts throughout the same:

Figure 1 is a view looking at the outside of the removable flange of the improved rim structure.

Figure 2 is an outside view of the complemental section which is mounted upon the wheel felly.

Figure 3 is a transverse section through the complete rim showing it in position on the wheel felly.

Figure 4 is a fragmentary detail view showing the interlocking connection between the two sections of the rim.

In the drawing, in Figure 3, the reference character 1 designates the felly of an automobile wheel, 2 designates a relatively stationary section of the rim, and 3 indicates the removable, or complemental section.

The rim section 2 comprises a tire engaging flange 4, and an endless ring-like band 5. This band is provided on its outer edge with circumferentially spaced radial projections including apertured lugs 6, and intervening locking tongues 7. The lugs are of truncated triangular form, while the tongues are substantially L-shaped or right angular in longitudinal section as indicated plainly in Figure 4.

The complemental rim section 3 comprises a relatively wide ring forming a flange 8. This ring is provided with apertured lugs 9, and retaining or locking lugs 10. The lugs 9 are disposed opposite the lugs 6, while the tongues 7 are interengaged with the tongues 10, as represented in Figure 4. This is accomplished by rotating the removable ring-like section 3 with respect to the relatively stationary section 2. The wheel felly carries bolts 11, and these extend through the aligned holes in the lugs 6, and 9. Then nuts 12 are placed on the threaded ends of the bolt to hold the two sections of the rim together. Obviously, this allows the sections to be readily disconnected by simply removing the nut, withdrawing the bolt, and then turning one section of the rim with respect to the other. This disengages the interconnected tongues, and allows easy removal of the tire.

By carefully considering the description in connection with the drawings, persons skilled with automobile wheel and tire rims will be able to obtain a clear understanding of the invention. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new is:—

A tire rim for a wheel felly, comprising a pair of complemental sections, one section embodying an endless ring-like band to fit upon the wheel felly, said band being provided with an angularly disposed tire engaging the flange on one edge and with retaining tongues on its opposite edge, said tongues having offset portions, said other section comprising an endless ring having an edge abutting said opposite edge of the band and forming the remaining tire engaging flange, said ring being equipped with tongues having offset portions abutable with the tongues on said band to hold the ring and band together, the abutting surfaces of the tongues being disposed in substantially the same plane with the abutting edges of the band and ring, and all of said tongues extending inwardly and radially along one side of the felly.

In testimony whereof I affix my signature.

CHESLEY E. STIGERS.